(12) United States Patent
Vanini et al.

(10) Patent No.: US 10,243,858 B2
(45) Date of Patent: *Mar. 26, 2019

(54) LOAD BALANCING WITH FLOWLET GRANULARITY

(71) Applicant: Cisco Technology, Inc., San Jose, CA (US)

(72) Inventors: Erico Vanini, Balerna (CH); Rong Pan, Saratoga, CA (US); Mohammadreza Alizadeh Attar, Cambridge, MA (US); Thomas J. Edsall, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,531

(22) Filed: Jan. 12, 2018

(65) Prior Publication Data

US 2018/0139138 A1  May 17, 2018

Related U.S. Application Data

(63) Continuation of application No. 15/003,172, filed on Jan. 21, 2016, now Pat. No. 9,923,828.

(60) Provisional application No. 62/222,248, filed on Sep. 23, 2015.

(51) Int. Cl.
*H04L 12/803* (2013.01)
*G06F 13/28* (2006.01)
*H04L 12/911* (2013.01)
*H04L 12/923* (2013.01)
*H04L 12/707* (2013.01)

(52) U.S. Cl.
CPC ............ *H04L 47/125* (2013.01); *H04L 45/24* (2013.01); *H04L 47/122* (2013.01); *H04L 47/762* (2013.01); *H04L 47/822* (2013.01)

(58) Field of Classification Search
CPC ... H04L 47/125; H04L 47/122; H04L 47/762; H04L 45/24; H04L 47/822
See application file for complete search history.

(56) References Cited

U.S. PATENT DOCUMENTS

| | | | |
|---|---|---|---|
| 2006/0120405 A1* | 6/2006 | Engbersen | G06F 13/28 370/473 |
| 2013/0265983 A1 | 10/2013 | Jelinek | |
| 2014/0108489 A1 | 4/2014 | Glines et al. | |
| 2015/0124611 A1 | 5/2015 | Attar et al. | |

(Continued)

*Primary Examiner* — Kiet Tang
(74) *Attorney, Agent, or Firm* — Edell, Shapiro & Finnan, LLC (57) ABSTRACT

A first flowlet of a flow from a source network device to a destination network device is assigned to a first path of a plurality of paths between the source device and the destination device. The assignment of the first flowlet to the first path is made by a network connected device. A second flowlet is detected in response to an interruption in transmission of the flow due to congestion along the first path, wherein the interruption is longer in duration than a difference in a transmission time between the source network device and the destination network device along each of the plurality of paths. The second flowlet is assigned to a second path of the plurality of paths by the network connected device. According to some example embodiments, the second path is randomly selected from the plurality of paths.

20 Claims, 12 Drawing Sheets

(56) References Cited

U.S. PATENT DOCUMENTS

| | | |
|---|---|---|
| 2015/0124652 A1 | 5/2015 | Dharmapurikar et al. |
| 2017/0048144 A1* | 2/2017 | Liu ..................... H04L 47/122 |
| 2017/0085485 A1 | 3/2017 | Vanini et al. |

* cited by examiner

OVERALL AVERAGE, SYMMETRIC

FIG.10A

RELATIVE LOAD % IF NO LINK DOWN

OVERALL AVERAGE, ASYMMETRIC

LOAD BALANCING WITH FLOWLET GRANULARITY

CROSS REFERENCE TO RELATED APPLICATION

This application is a continuation of U.S. Non-Provisional patent application Ser. No. 15/003,172, filed Jan. 21, 2016, which in turn claims priority to U.S. Provisional Application No. 62/222,248 filed on Sep. 23, 2015, the contents of both of which are incorporated herein by reference in their entirety.

TECHNICAL FIELD

The present disclosure relates to load balancing in networks.

BACKGROUND

Data center networks have been widely adopted by cloud and enterprise environment providers to support various types of applications ranging from financial services to big data analytics. Multi-rooted tree designs, such as spine-and-leaf designs, have become dominant in data centers because they are scalable and can achieve full bisectional bandwidth via multi-pathing. However, multi-rooted tree networks do not necessarily result in an ideal data center network where packets can be perfectly transferred to output ports without incurring congestion inside the fabric. Precise load balancing is important if multi-rooted tree designs are to approach the performance of an ideal data center network.

DESCRIPTION OF EXAMPLE EMBODIMENTS

Overview

Presented herein are techniques to carry out load balancing based on flowlets. Specifically, a first flowlet of a flow from a source network device to a destination network device is assigned to a first path of a plurality of paths between the source device and the destination device. The assignment of the first flowlet to the first path is made by a network connected device. A second flowlet is detected in response to an interruption in transmission of the flow due to congestion along the first path, wherein the interruption is longer in duration than a difference in a transmission time between the source network device and the destination network device along each of the plurality of paths. The second flowlet is assigned to a second path of the plurality of paths by the network connected device. According to some example embodiments, the second path is randomly selected from the plurality of paths. According to other example embodiments, a probability of selecting the second path from the plurality of paths is related to, e.g., proportional to, the size of flowlets along the second path. According to still other example embodiments, the selection of the second path from the plurality of paths is performed to equalize the average length of flowlets across each of the plurality of paths.

Detailed Description

Figure 1:
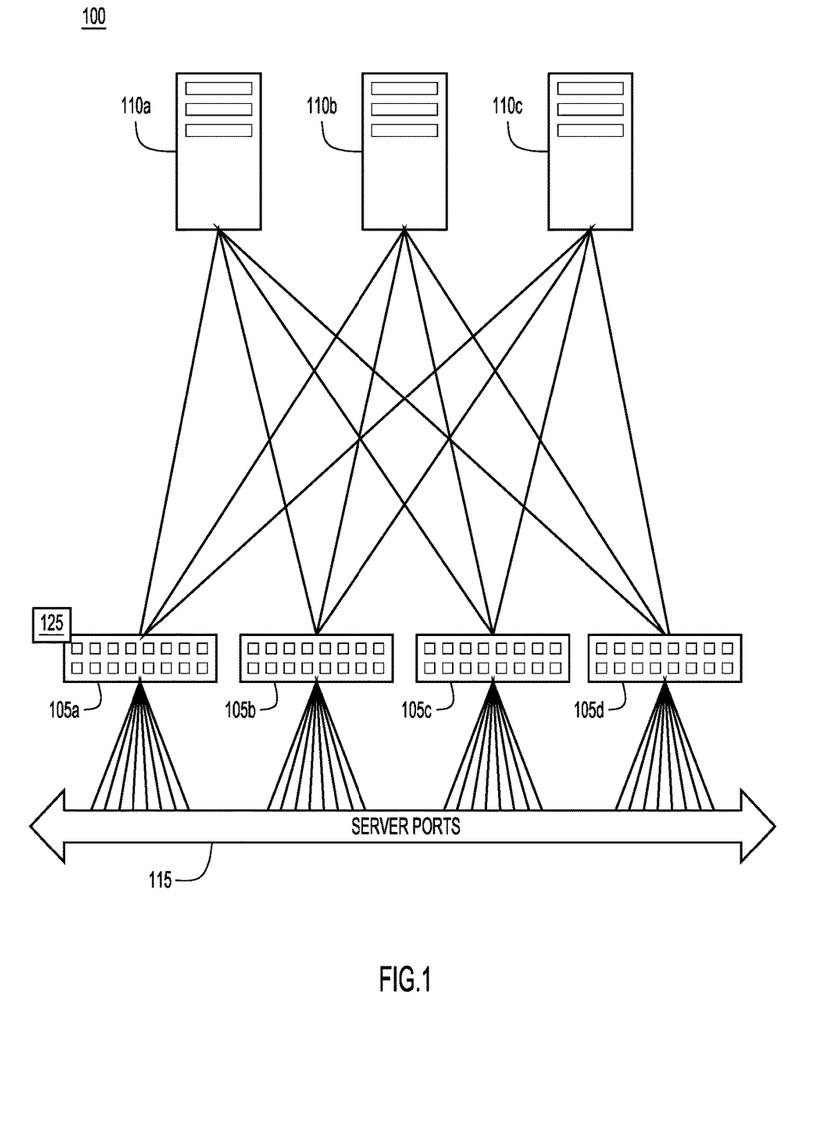
FIG. 1 is an illustration of a network environment configured to provide load balancing with flowlet granularity, according to an example embodiment.

With reference to FIG. 1, depicted therein is a network 100 configured to perform load-balancing with flowlet granularity. Network 100 is designed with a multi-rooted tree design, and more specifically, a spine-and-leaf design. Accordingly, network 100 includes leaf switches 105a-d and spine switches 110a-c. Each of leaf switches 105a-d connects to a plurality of server ports 115. When traffic is sent from a server connected to leaf switch 105a to a server connected to leaf switch 105d, the traffic can take a plurality of different paths through the spine switches 110a-c. Specifically, each of spine switches 110a-c provides a path between leaf switch 105a and leaf switch 105d. Therefore, the traffic sent from leaf switch 105a to leaf switch 105d can be balanced across these three paths. In order to balance the traffic across spine switches 110a-c, included in leaf switch 105a is load balancer. Specifically, load balancer 125 will balance the traffic across spine switches 110a-c with flowlet granularity according to the techniques described herein, and with reference to FIGS. 2-7 below.

If load balancer 125 balances loads according to an Equal Cost MultiPath (ECMP) algorithm, the balancing of traffic across the paths through network 100 may not be optimal. ECMP is the standard load balancing design adopted in data centers today. ECMP uses hashing to assign flows onto available paths with flow level granularity. The available paths may be a subset of all available paths through the network that represent the set of "best paths" through the network. In an ECMP environment, it is intended that the "best paths" utilize similar levels of network resources, and therefore, are known as equal cost paths. Once a flow is assigned to a path through ECMP load balancing, the flow remains on that path until the flow completes. It is well known that ECMP cannot balance loads adequately, as the hashing often leads to congested hot spots, especially in an asymmetric topology or in a symmetric topology with a widely varying traffic load. Hash collisions at the flow level can cause substantial fluctuations in load imbalances. Furthermore, ECMP adopts local decisions and is unaware of potential downstream congestions, and hence can further exacerbate the traffic imbalance. On the other hand, by applying load balancing with flowlet level granularity as described herein, load balancers like load balancer 125 may alleviate some or all of the above-described shortcomings of ECMP.

"Flowlets" as used in the present disclosure are portions of a flow that take advantage of natural gaps in a network traffic flow, such as in a Transfer Control Protocol (TCP) flow. Specifically, network traffic is generally "bursty" in nature, meaning packets are sent in bursts, with natural gaps formed between the packet bursts. Flowlets in a multipath environment are defined as the "bursts" of packets that are separated by breaks or interruptions in the transmission of packets that are greater than differences in transmission times between each of the multipaths. In a multipath environment in which a subset of all possible paths are used for load balancing (e.g., the "best paths" as determined in an ECMP environment), the breaks or interruptions in the transmission of packets is greater than the differences in transmission times between each of the paths in the subset of paths.

The techniques described herein leverage how TCP flowlets behave differently on different paths based on congestion. Flowlets remain/exist longer on less congested paths and terminate earlier on congested paths. In a way, a flowlet's size implicitly carries information about network congestion and can be used to guide a load balancer, such as load balancer 125, to make informed decisions without explicit network feedback. Current congestion control mechanisms in TCP utilize a congestion window that limits the total number of unacknowledged packets that may be in transit end-to-end. The size of the congestion window increases on uncongested paths, while the congestion window shrinks for paths that are experiencing congestion. A smaller congestion window means that fewer packets may be in transit over a path at any one time, which means the path becomes "jammed." As a result, interruptions that are longer than differences in transmission times between each of the ECMPs happen more frequently at congested links. Accordingly, flowlets along congested links are shorter (i.e., transmit less data) than flowlets along uncongested links.

By determining the length of the flowlets and leveraging this information, effective load balancing may be achieved. Flowlet length may be used to determine downstream congestion along a path without relying on resource intensive signaling messages. Instead, the implicit information contained in the length of the flowlets is leveraged to make load balancing decisions. In other words, flowlet sizes vary depending on path congestion and can used as a form of implicit network feedback that helps improve load balancer design. Designs implementing the techniques described herein may allow for load balancing schemes that are simple to implement but perform significantly better than ECMP.

Accordingly, described herein are techniques in which flowlets are randomly assigned to new paths, achieving load balancing benefits over related load balancing techniques. According to other techniques described herein, the size of flowlets is used to predict which paths are congested, and assign new flowlets to paths based on the relative size of flowlets along the paths. Specifically, paths, which when assigned flowlets, result in short flowlets are considered congested and new flowlets are less likely to be assigned to the congested paths. On the other hand, paths which when assigned flowlets result in long flowlets are considered less congested. Accordingly, new flowlets are more likely to be assigned to these paths. The selection of paths for new flowlets may be selected so that the average length of flowlets is equalized across the plurality of multipaths. The paths to which the flowlets are assigned may be the same "best paths" that would be used in an ECMP load balancing environment.

Figure 2:
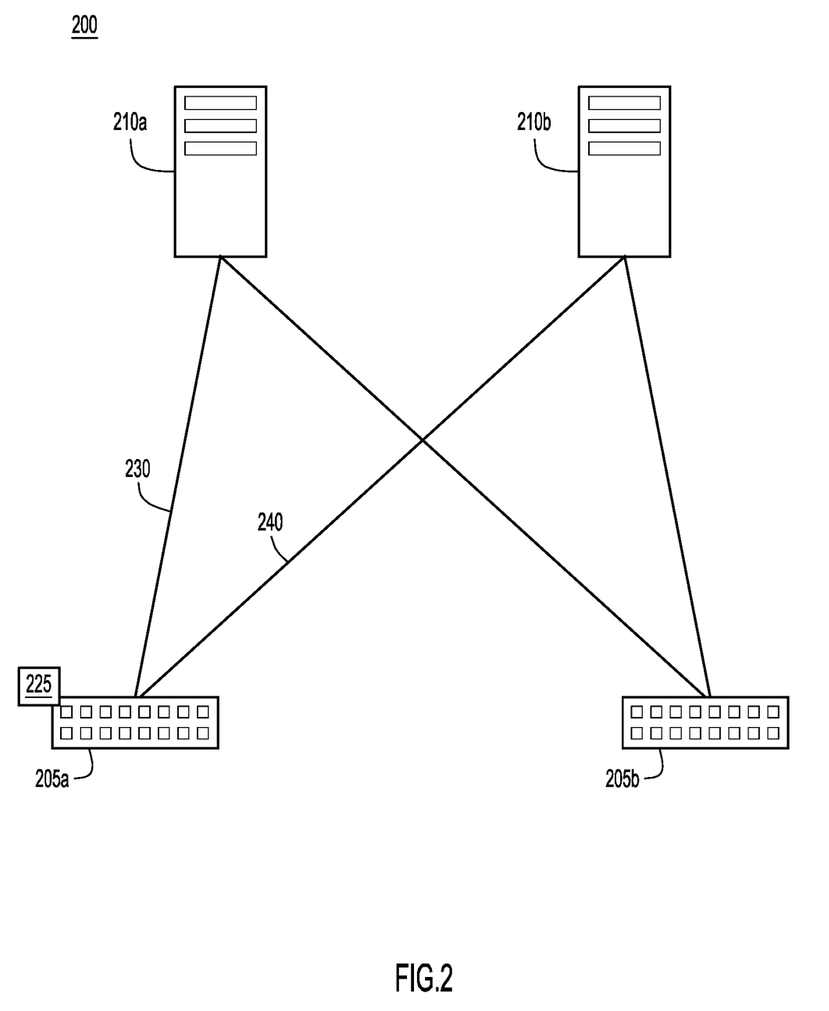
FIG. 2 is an illustration of the effect of congestion on flowlet length, according to an example embodiment.

Turning to FIG. 2, illustrated therein is a simplified network environment 200, in which two paths 230 and 240 (i.e., two paths within a multipath environment) are provided between leaf switch 205*a* and leaf switch 205*b*. Path 230 utilizes spine switch 210*a*, while path 240 utilizes spine switch 210*b*. The transmission time along path 230 is a duration $D_1$ while the transmission time along path 240 is a duration $D_2$. An interruption δ between the transmission of packets of a flow is sufficient to break the flow into flowlets if the length of duration δ satisfies the following relationship:

$$\delta > |D1 - D2|.$$

In other words, if the time of interruption δ between the transmissions of consecutive packets is greater than the difference in transmission time along each of the paths in the multipath environment, the time δ is considered to have broken the flow into flowlets. By separating flowlets with δs that satisfy the above-relationship, flowlets may be load balanced across multiple paths in the multipath environment while ensuring the packets are received at leaf switch 205*b* in the correct order. If δ was not chosen according the relation above, and was instead selected to be less than the difference in transmission time between the paths 230 and 240, packets may be received at their destination out of order.

For example, if δ was chosen to be less than the difference in transmission times between paths 230 and 240, and packets of a first flowlet were transmitted over path 230 while later sent packets of a second flowlet were transmitted over path 240, the later-sent packets using path 240 could arrive at leaf switch 205*b* prior to earlier-sent packets using path 230. Specifically, if time D2, the transmission time of over path 240 was less and the transmission time D1 over path 230, and δ was chosen to be less than the difference between D1 and D2, packets sent over path 240 could arrive at leaf switch 205*b* prior to packets previously sent over path 230. On the other hand, if δ is chosen so that it is greater than a difference between D1 and D2, it is impossible for a later sent packet sent over path 240 to arrive before an earlier sent packet using path 230, and vice versa. By selecting δ to be greater than the difference between D1 and D2, load balancer 225 can balance traffic with flowlet granularity without fear that packets will arrive at leaf switch 205*b* in an order different from the order in which they were sent.

According to a more complicated example, comprising a plurality of paths $P_1$ through $P_N$ having corresponding transmission durations $D_1$ through $D_N$, δ may be selected so that it satisfies the following relation:

$$\delta > \max(D_1, D_2, D_3, \ldots D_N) - \min(D_1, D_2, D_3, \ldots D_N).$$

Figure 3:
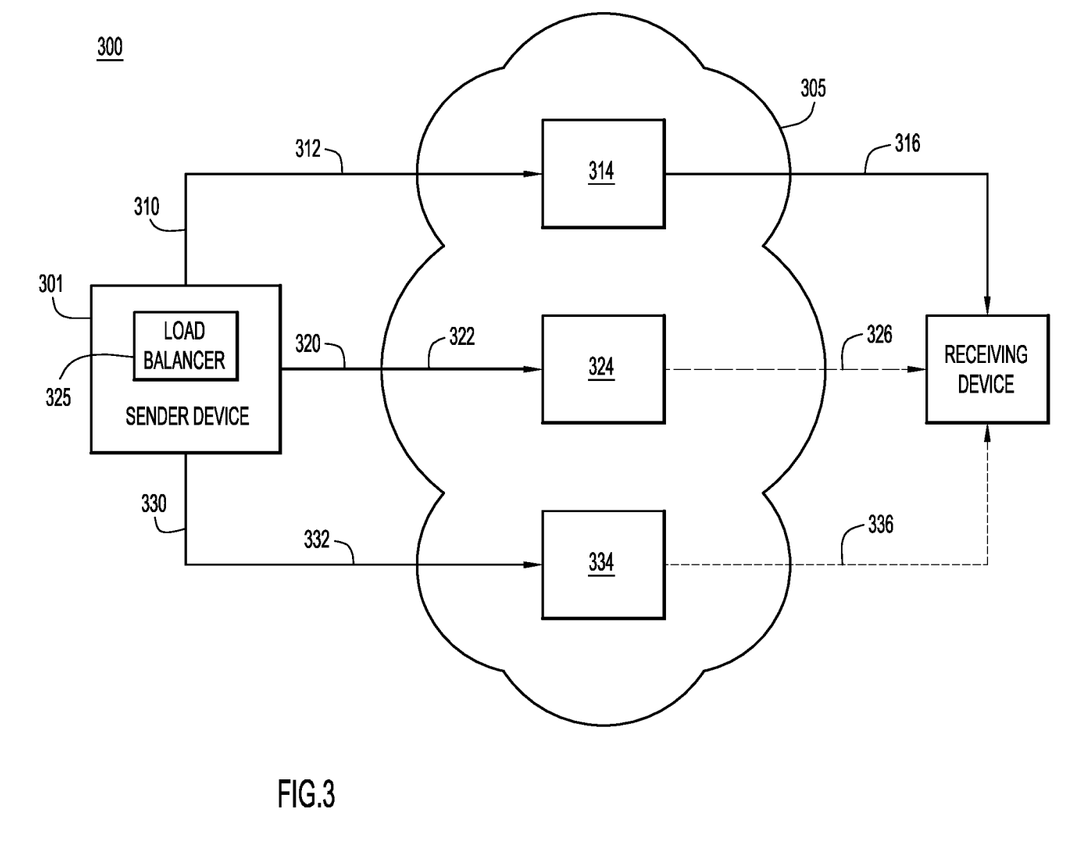
FIG. 3 is an illustration of a first method for load balancing with flowlet granularity, according to an example embodiment.

With reference now made to FIG. 3, depicted therein is a first method of load balancing flows with flowlet granularity. Illustrated in FIG. 3 is a network environment 300 in which traffic flows are sent through network 305 over three different network paths from sender device 301 to receiving device 302. Specifically, paths 310, 320 and 330 traverse network 305 between device 301 and device 302. Paths 310, 320 and 330 may represent all of the paths between sender device 301 and receiving device 302 through network environment 300, or paths 310, 320 and 330 may represent a subset of paths, such as the "best paths" between sender device 301 and receiving device 302. The initial segments of paths 310, 320 and 330 (i.e., device 301 itself and network links 312, 322 and 332, respectively) are not congested, as illustrated through the solids lines of network links 312, 322 and 332. Device 301 is generally unaware of the congestion level at downstream portions of the paths. Specifically, device 301 is unaware of levels of congestion at network nodes 314, 324 and 334, as well as levels of congestion along network links 316, 326 and 336. Accordingly, device 301, and more specifically load balancer 325, is unaware that path 310 remains uncongested downstream from network link 312, as illustrated by the solid line for downstream link 316. Device 301 and load balancer 325 are also unaware that path 320 experiences light congestion downstream from link 322, as illustrated by the long dashed line associated with network link 326. Device 301 and load balancer 325 would be similarly unaware that third path 330 is experiencing heavy downstream congestion, as illustrated through the short dashed line associated with network link 336.

According to the first method described herein, load balancer 325 balances loads across paths 310, 320 and 330 by randomly assigning flowlets to one of paths 310, 320 or 330. In other words, if a flow is initially assigned to path 310, when an interruption in packet transmission is experienced that is greater than the difference in transmission times between paths 310, 320 and 330, i.e., when a new flowlet is formed, load balancer will randomly reassign the flow (and the new flowlet) to one of paths 310, 320 or 330. In other words, according to the example of FIG. 3, load balancer 325 randomly reassigns the flow to one of a plurality of paths every time a new flowlet of the flow is detected.

Due to the nature of flowlets, this random reassignment of flows to the same or different paths will result in a self-regulation or self-balancing of different flows across the different paths. As a result of the congestion windows for paths 310, 320 and 330, flowlets traversing path 310 will be longer (i.e., will transmit more data) than the flowlets that traverse paths 320 and 330. This is because path 310 is less congested than paths 320 and 330, and therefore, will have a larger congestion window. The larger congestion window for path 310 results in a bigger flowlet and fewer flowlets within the flow. Accordingly, more data will be sent by each of the flowlets sent across path 310. Similarly, flowlets traversing path 320 will be longer than those traversing path 330. Because the flowlets assigned to paths 320 and 330 are shorter (i.e., terminate more quickly), the congestion along these paths will affect less data, and therefore, the assignment of flowlets to the paths is self-regulating. On the other hand, flowlets assigned to path 310 will be longer, meaning more data will be transferred in these flowlets.

As compared to ECMP load balancing, which selects a path for an entire flow using hashing (i.e., pseudo randomly), the techniques described herein mitigate the effect of the congestion because flowlets assigned to congested paths are shortened. In other words, if a flowlet is "unlucky" and is sent on a congested path, the flowlet would quickly terminate and the flow would give itself another chance of being sent along good (i.e., less congested) paths. "Lucky" flows that are assigned to uncongested paths will have flowlets that exist longer and transmit more data over their paths as uncongested paths. Accordingly, even when flowlets are randomly assigned to paths of a multipath environment, the paths will self balance due to the effect of congestion on the size of flowlets.

Figure 4:
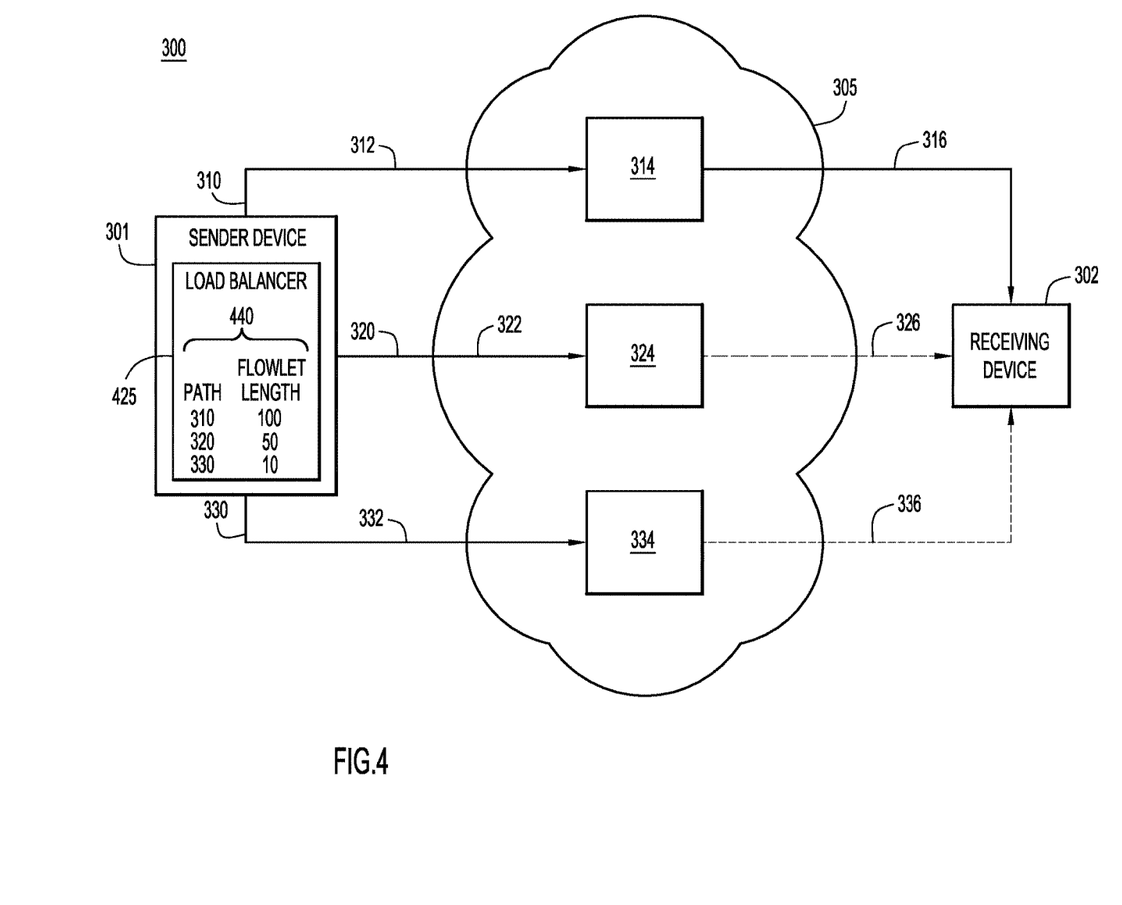
FIG. 4 is an illustration of a second method for load balancing with flowlet granularity, according to an example embodiment.

With reference now made to FIG. 4, illustrated therein is a second method of performing load balancing at the flowlet level, according to the techniques described herein. The method of FIG. 4 begins the same way as that of FIG. 3. When device 301 sends flowlets to device 302, the flowlets are initially assigned to a random one of paths 310, 320 and 330. The example of FIG. 4 modifies the process of FIG. 3 through the use of data 440 collected and maintained by load balancer 425.

Load balancer 425 collects and stores data 440 that indicates the length of flowlets sent along paths 310, 320 and 330. The length of flowlets may be a measure of the amount of data sent in flowlets sent along each path. According to some examples of the method of FIG. 4, data 440 includes the length of every flowlet sent from device 301 to device 302. According to other examples, data 440 may include statistical data at the path level, for example, the average length (i.e., average amount of data) of flowlets set along each path. Once data 440 is generated, the assignment of new flowlets to paths 310, 320 and 330 may be determined based on the data 440. For example, the assignment of flowlets to paths 310, 320 and 330 may be weighted based on data 440. Similarly, the initial assignment of a flow, i.e., the assignment of the first flowlet of a flow, may be assigned based on data 440.

According to the example of FIG. 4, the average size of each flowlet along path 320 is five times that of path 330. The average size of each flowlet sent along path 310 is ten times that of path 330. Therefore flowlets may be assigned to path 310 with a higher probability than they will be to paths 320 and 330. The higher probability may be based upon the relationship between the average flowlet size along each path. The probabilities of assignment to each of paths 310, 320 and 330 may be adaptively modified to find an optimum split and/or ratio between the multiple paths. For example, the probabilities for assigning flowlets to the paths may be selected to equalize the average flowlet size across the paths. Similarly, if a path has an average flowlet size that is below a predetermined threshold, no new flowlets may be assigned to that path within a particular time window.

In FIG. 4, data 440 may be stored in the form of a flowlet table that records which flowlets are active and their path choices. When a new flowlet shows up (i.e. its corresponding flowlet table entry is not active), the techniques described herein randomly select a path for this new flowlet and record its selection in the flowlet table. Later packets from active flowlets would continue on their chosen paths. Once data for the size of flowlets along different paths is accumulated, the data may be used to assigned new flowlets to less congested paths.

Figure 5:
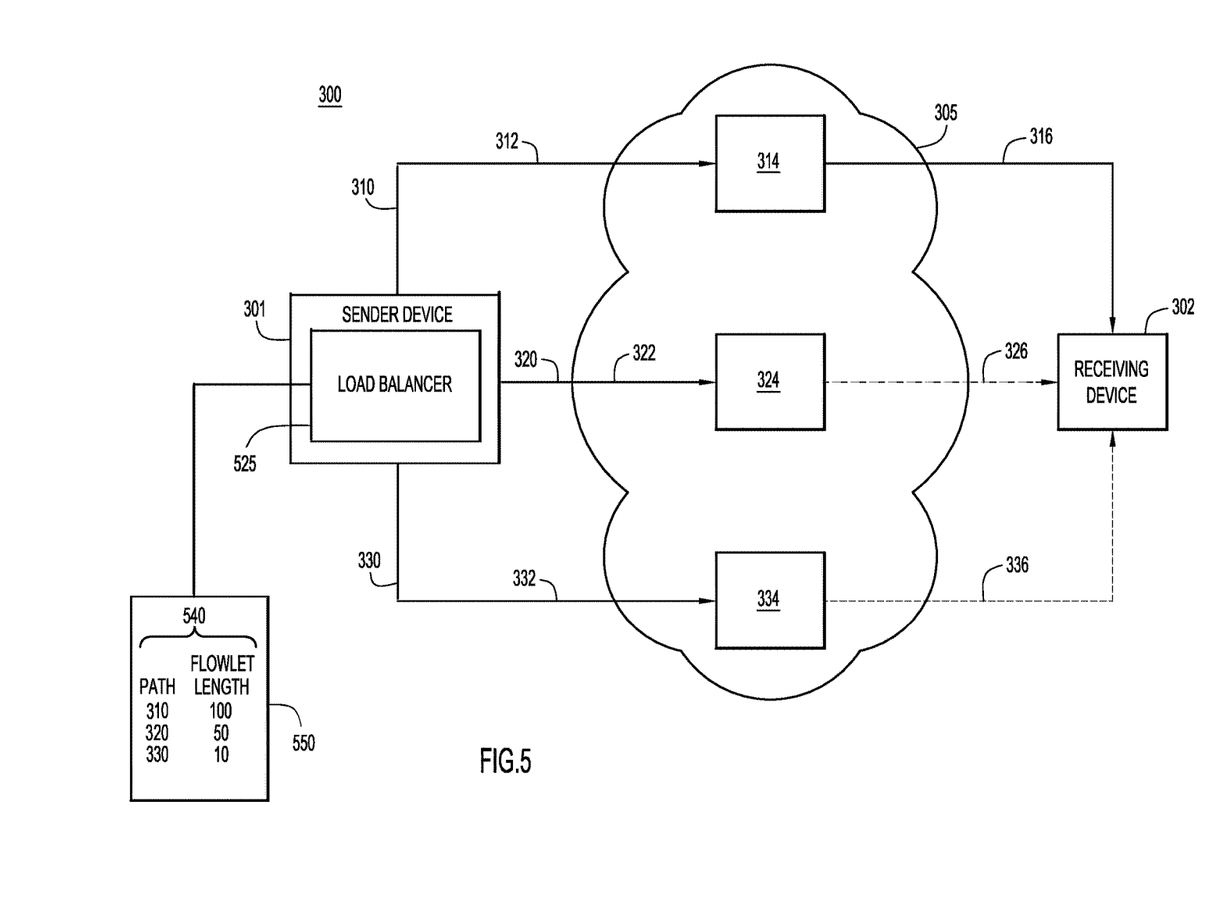
FIG. 5 is an illustration of a third method for load balancing with flowlet granularity, according to an example embodiment.

With reference now made to FIG. 5, depicted therein is a modification of the method of FIG. 4. The example of FIG. 5 is similar to that of FIG. 4 in that data 440 is maintained for paths and flowlet sizes. FIG. 5 differs from that of FIG. 4 in that data 540 is stored at a different network-connected device, device 550. Device 550 may be a device analogous to a network controller or a path computation element from the ECMP context. Accordingly, device 550 may communicate with load balancer 525 to assign flows to paths 310, 320 and 330 based on the content of data 440.

Figure 6:
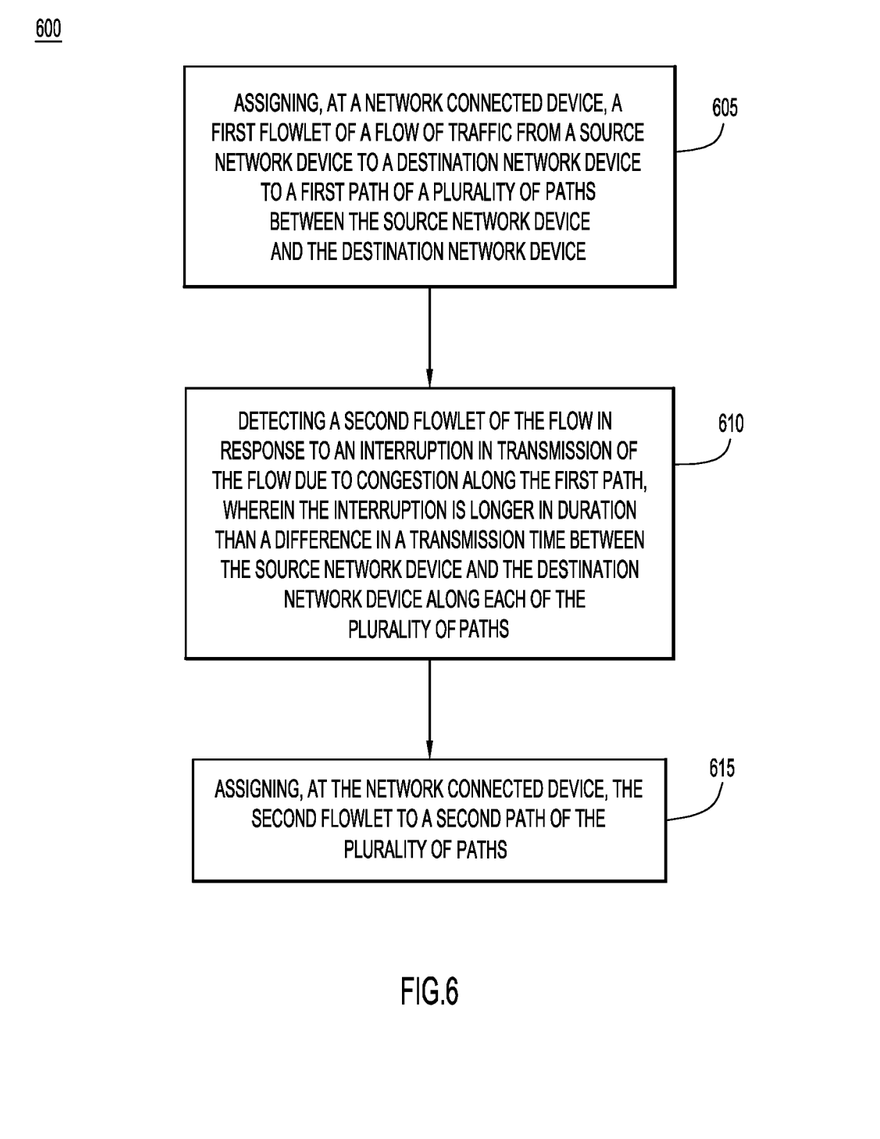
FIG. 6 is a flowchart illustrating a process for load balancing with flowlet granularity, according to an example embodiment.

With reference now made to FIG. 6, depicted therein is flowchart 600 illustrating a process for performing load balancing with flowlet level granularity. The process of flowchart 600 begins in operation 605 where a first flowlet of a flow is assigned to a first path of a plurality of paths between a source network device and a destination network device. The assignment of first flowlet may be the initial assignment of a new flow to a path, or it may be the assignment of a flowlet of an existing flow. The assignment of the first flowlet to the path may be a random assignment to one of the plurality of paths, or it may be an assignment based on the length (i.e., the amount of data) sent over the plurality of paths by other flowlets. The plurality of paths may be the "best paths" that would be utilized in an ECMP environment, the plurality of paths may be all of the possible paths through the network between the source network device and the destination network device, or the plurality of paths may be some other subset of all of the possible paths.

The decision to assign the first flowlet may be made by a load balancer internal to or external to the source network device. Accordingly, the network connected device that assigns the first flowlet to the path may be the same device or a different device than the source network device. The source network device may comprise one or more of a leaf switch, a spine switch or a server device connected to a leaf switch.

In operation 610, a second flowlet of the flow is detected in response to an interruption in transmission of the flow due to congestion along the first path. The interruption of operation 610 may be sufficient to define a new flowlet (i.e., the second flowlet) and therefore, the interruption in transmission of the flow may be longer in duration than a difference in transmission time between the source network device and the second network device along each of the plurality of paths.

In operation 615, the second flowlet is assigned to a second path of the plurality of paths. The assignment of the second flowlet to the second path may include randomly assigning the second flowlet to a path, as described above with reference to FIG. 3. Other examples may include assigning the second flowlet to a path based upon the length (i.e., the amount of data) of flowlets sent over the plurality of paths by other flowlets. The data about the length of the flowlets sent over the plurality of paths may include data for the particular flow to which the second flowlet belongs and/or flowlets of other flows sent over the plurality of paths. The assignment of the second flowlet to the second path may be performed to equalize the average flowlet length across the plurality of paths.

In addition to methods like those illustrated in FIGS. 3-6, also described herein are devices and computer readable media configured to implement the techniques described herein. Some apparatuses implementing the techniques may include custom designed processors, such as application specific integrated circuits (ASICs) or field programmable gate arrays encoded with physical logic structures to carry out the techniques described herein. An example apparatus of configured to implement the techniques described herein is illustrated in FIG. 7.

Figure 7:
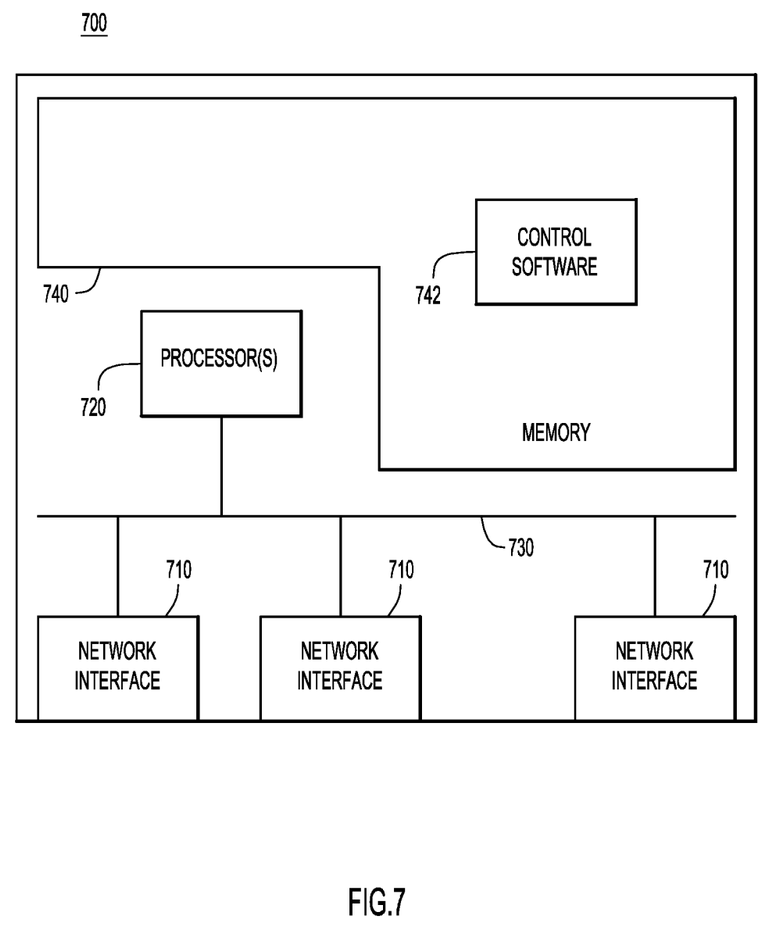
FIG. 7 is a block diagram of a device configured to provide load balancing with flowlet granularity, according to an example embodiment.

With reference to FIG. 7, device 700 may be a network connected device configured to perform the techniques described herein. Device 700 includes network interfaces (e.g., network ports) 710 which may be used to receive and send packets over a network. The network interfaces 710 may included as part of a network interface unit (e.g., a network interface card). Accordingly, network interfaces 710 may be embodied as wired interfaces, a wireless interfaces, optical interfaces, electrical interfaces, or a combination thereof. One or more processors 720 are provided to coordinate and control device 700. The processor 720 is, for example, one or more microprocessors or microcontrollers, and it communicates with the network interfaces 710 via bus 730. Memory 740 stores software instructions 742 which may be executed by the processor 720. For example, control software 742 for device 700 includes instructions for performing the techniques described above with reference to FIGS. 1-6. In other words, memory 740 includes instructions for device 700 to carry out the operations described above in connection with FIGS. 1-6. Memory 740 may also store the data 440 and 540 as discussed above with reference to FIGS. 4 and 5. This data may be stored in a database in memory 740, and control software 742 may allow the processor 720 to access the data.

Memory 740 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 740 may be or include one or more tangible (non-transitory) computer readable storage media (e.g., a memory device) encoded with software comprising computer executable instructions. When the instructions of the control software 742 are executed (by the processor 720), the processor is operable to perform the operations described herein in connection with FIGS. 1-6.

Figure 8A:
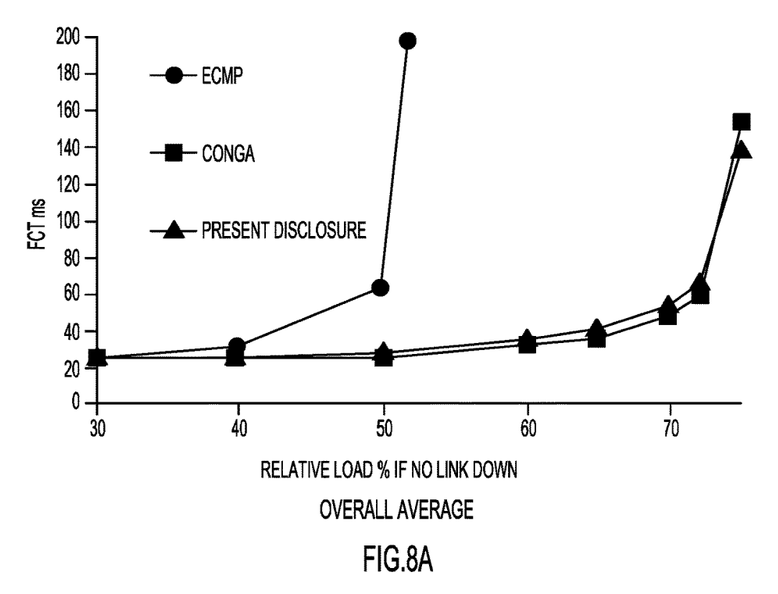
FIGS. 8A-8C are graphs comparing the performance of load-balancing of related art techniques with those disclosed herein as applied to a data mining workload, according to an example embodiment.
Figure 8B:
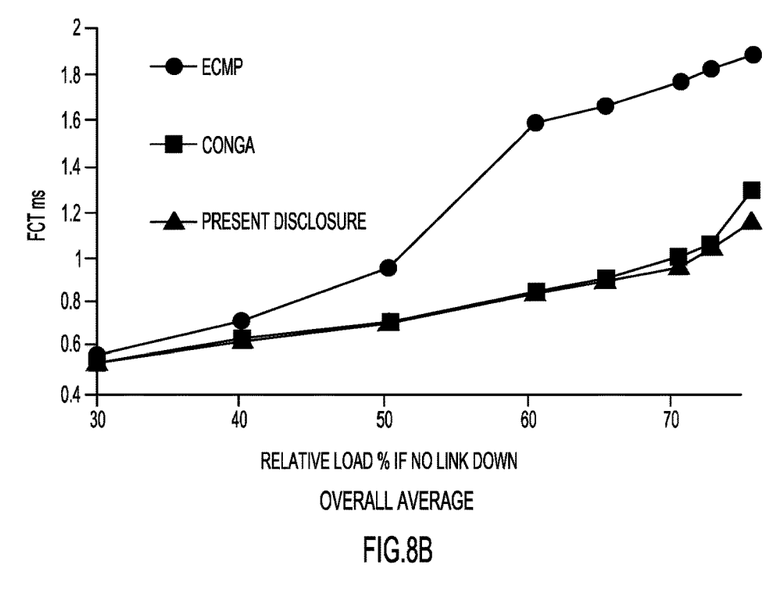
Figure 8C:
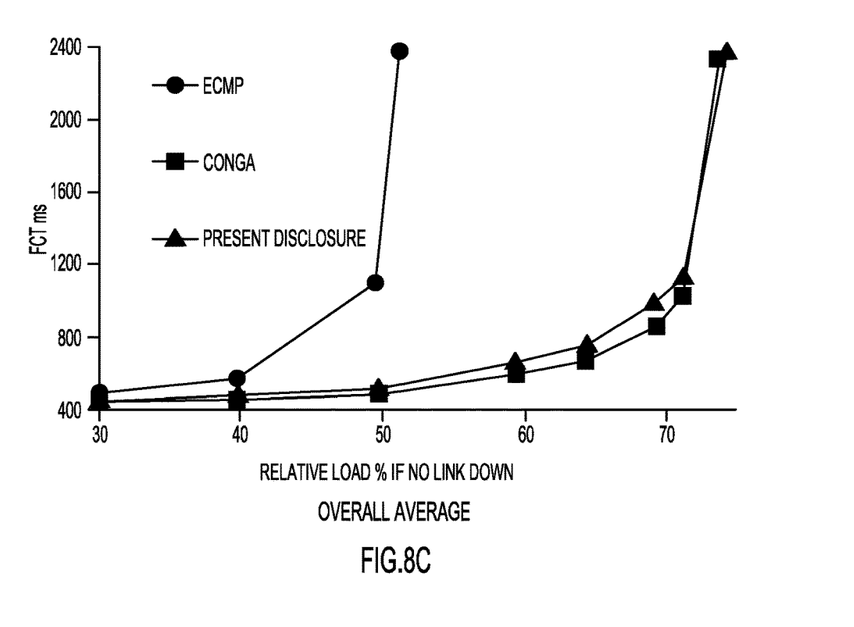

With reference now made to FIGS. 8A-8C, depicted therein is a comparison of the flowlet-level switching as described herein compared to ECMP switching, and another load balancing technique known as "CONGA." CONGA is a load balancing technique that uses signaling to transmit awareness of congestion levels throughout network paths. CONGA operates by including a congestion metric in each packet sent as part of a flow. This congestion metric is included in an overlay header that represents the extent of congestion the packet experiences as it traverses through a fabric network. The metric is updated hop-by-hop and indicates the utilization of the most congested link along the packet's path. This information is stored at the destination leaf on a per source leaf, per path basis and is opportunistically fed back to the source leaf by piggybacking on packets in the reverse direction. Accordingly, even though CONGA implementations may provide for load balancing with flowlet-level granularity, they do so based on explicit congestion metrics, and require additional overhead and processing by the switches within a network in order to store and feedback the congestion metrics.

Illustrated in FIGS. 8A-8C is a comparison of ECMP, CONGA, and the techniques described herein, when performing datamining operations over a network. Each of FIGS. 8A-8C provides a graph of flow completion time (FCT) in milliseconds versus the relative load in the network, assuming no links in the network are broken. FIG. 8A is a graph of FCT versus relative load for an average sized flow, FIG. 8B is a graph for a small-sized flow, and FIG. 8C is a graph for a large flow. As shown in these graphs, the techniques described herein provide load balancing that is substantially better than that provided by ECMP and similar to that of CONGA, but without the added overhead of the congestion metrics utilized by CONGA.

Figure 9A:
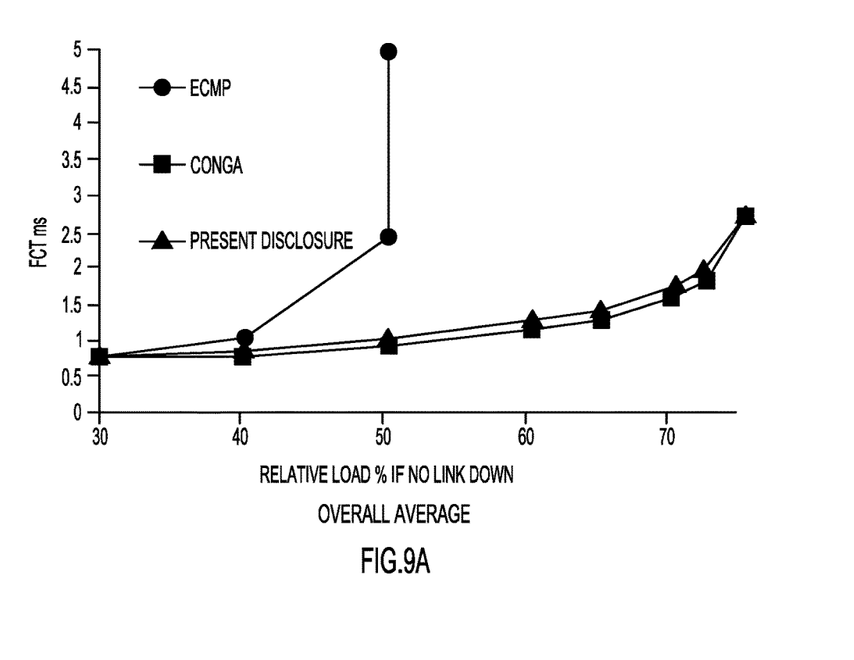
FIGS. 9A-9C are graphs comparing the performance of load-balancing of related art techniques with those disclosed herein as applied to an enterprise environment workload, according to an example embodiment.
Figure 9B:
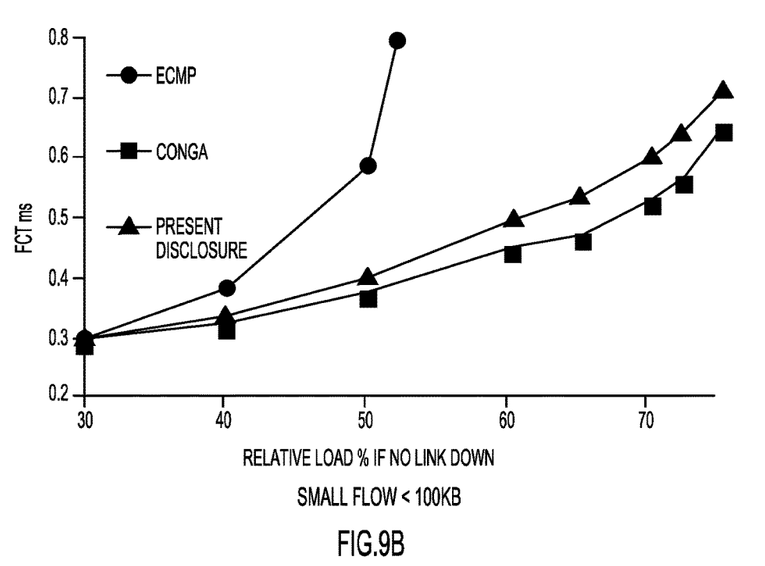
Figure 9C:
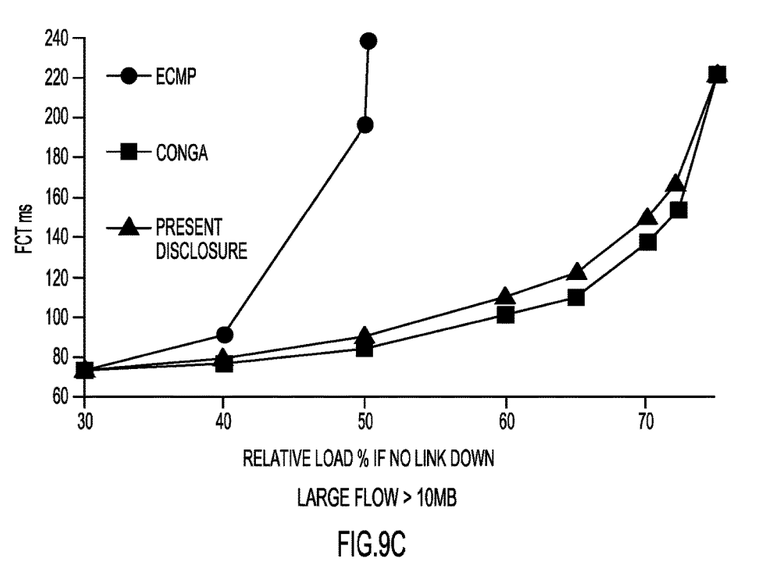
Figure 10A:
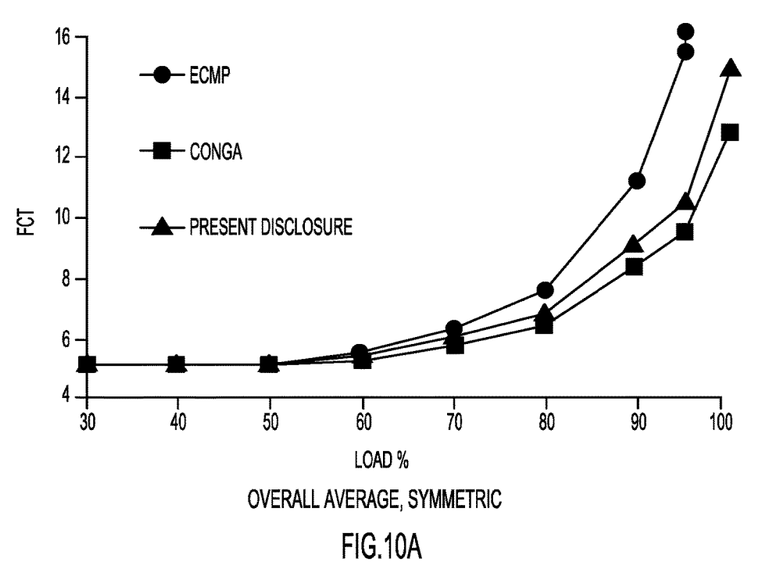
FIGS. 10A-10D are graphs comparing the performance of load-balancing of related art techniques with those disclosed herein as applied to a web searching workload, according to an example embodiment.
Figure 10B:
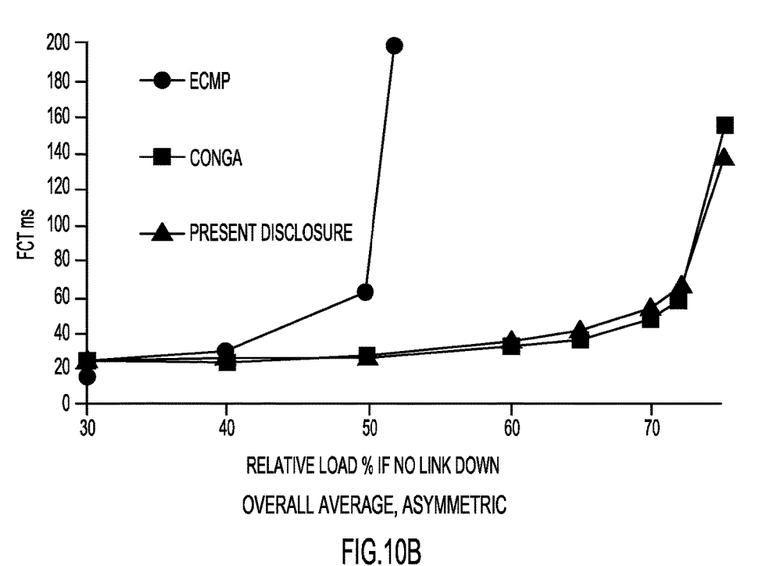
Figure 10C:
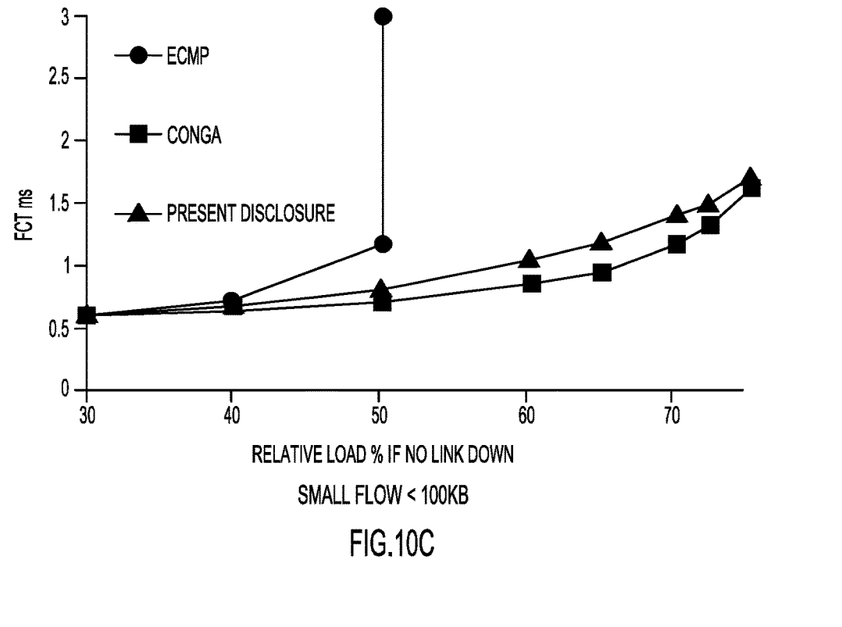
Figure 10D:
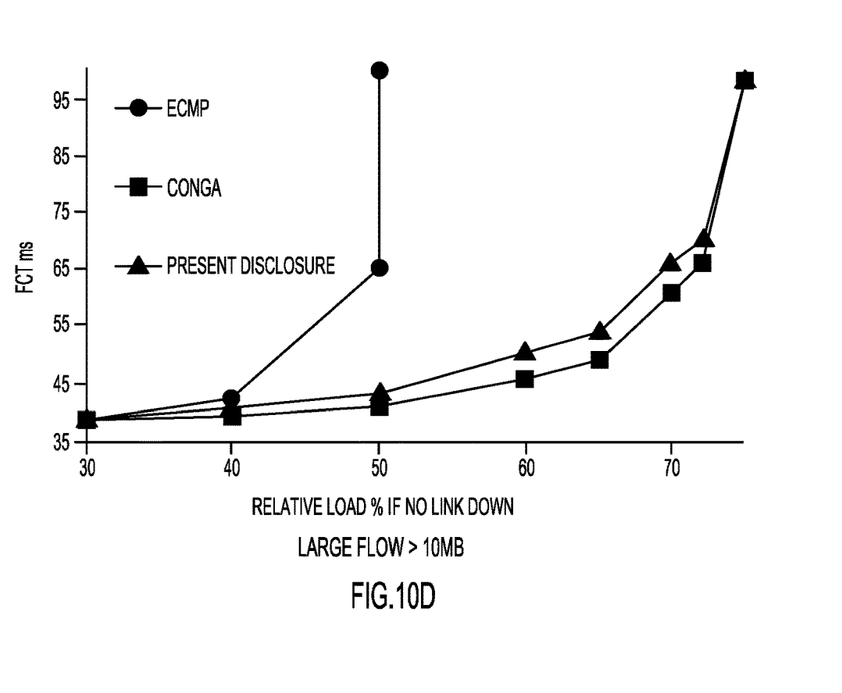

Comparisons similar to those of FIGS. 8A-8C are also illustrated in FIGS. 9A-9C and 10A-10D. FIGS. 9A-9C provide a comparison of ECMP, CONGA and the techniques of the present disclosure applied to an enterprise environment workload for an average, small and large flow, respectively. FIGS. 10A-10D provide a comparison of ECMP, CONGA and the techniques of the present disclosure applied to a web search workload for an average symmetric flow, an average asymmetric flow, a small flow and a large flow, respectively. As with the data mining workloads of FIGS. 8A-8C, the techniques of the present application outperform ECMP for enterprise and web search workloads, while providing performance similar to that of CONGA without the added overhead required in environments implementing CONGA load balancing.

In summary, provided herein are methods of load balancing traffic with flowlet level granularity. The methods assign a first flowlet of a flow from a source network device to a destination network device to a first path of a plurality of paths between the source device and the destination device. The assignment of the first flowlet to the first path is made by a network connected device. A second flowlet is detected in response to an interruption in transmission of the flow due to congestion along the first path, wherein the interruption is longer in duration than a difference in a transmission time between the source network device and the destination network device along each of the plurality of paths. The second flowlet is assigned to a second path of the plurality of paths by the network connected device. According to some example embodiments, the second path is randomly selected from the plurality of paths. According to other example embodiments, a probability of selecting the second path from the plurality of paths is related to, e.g., proportional to, the size of flowlets along the second path. According to still other example embodiments, the selection of the second path from the plurality of paths is performed to equalize the average length of flowlets across each of the plurality of paths.

Also provided herein is an apparatus configured to load balance traffic with flowlet level granularity. The apparatus includes processors which are configured to assign a first flowlet of a flow from a source network device to a destination network device to a first path of a plurality of paths between the source device and the destination device. The processors are configured to detect a second flowlet in response to an interruption in transmission of the flow due to congestion along the first path, wherein the interruption is longer in duration than a difference in a transmission time between the source network device and the destination network device along each of the plurality of paths. The processors assign the second flowlet to a second path of the plurality of paths. According to some example embodiments, the processors randomly select the second path from the plurality of paths. According to other example embodiments, the processors select the second path based on a probability related to, e.g., proportional to, the size of flowlets along the second path. According to still other example embodiments, the processors select the second path in order to equalize the average length of flowlets across each of the plurality of paths.

In addition to methods and apparatus, the present disclosure also provides non-transitory computer readable storage media encoded with software comprising computer executable instructions that when executed by a processor, provides load balancing with flowlet level granularity. The instructions, when executed, cause a first flowlet of a flow from a source network device to a destination network device to be assigned to a first path of a plurality of paths between the source device and the destination device. The instructions further cause the detection of a second flowlet in response to an interruption in transmission of the flow due to congestion along the first path, wherein the interruption is longer in duration than a difference in a transmission time between the source network device and the destination network device along each of the plurality of paths. The instructions further assign the second flowlet to a second path of the plurality of paths. According to some example embodiments, the instructions randomly select the second path from the plurality of paths. According to other example embodiments, the instructions select the second path based on a probability related to, e.g., proportional to, the size of flowlets along the second path. According to still other example embodiments, the instructions select the second path in order to equalize the average length of flowlets across each of the plurality of paths.

By implementing the methods, apparatus, system and computer readable storage media described herein, robust and self-compensating load balancing is achieved. Specifically, these techniques leverage the dependence of flowlet size on path congestion as implicit network feedback. This implicit feedback simplifies load balancer design while providing improvements over ECMP load balancing techniques. The techniques described herein offer simple but efficient load balancer designs, especially standard alone products where network feedback is not available.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method implemented at a network connected device, comprising:
    assigning, at the network connected device, a first flowlet of a flow of traffic from a source network device to a destination network device to a first path of a plurality of paths between the source network device and the destination network device;
    collecting, at the network connected device, data indicative of sizes of flowlets along paths of the plurality of paths by tracking one or more of an amount of data sent by flowlets along each of the plurality of paths or a duration of time of flowlets along each of the plurality of paths;
    detecting a second flowlet of the flow in response to an interruption in transmission of the flow along the first path, wherein the interruption is longer in duration than a difference in a transmission time between the source network device and the destination network device along each of the plurality of paths;
    selecting a second path from the plurality of paths based upon the data indicative of sizes of flowlets along paths of the plurality of paths; and
    assigning, at the network connected device, the second flowlet to the second path of the plurality of paths.

2. The method of claim 1, wherein collecting the data indicative of sizes of flowlets along paths of the plurality of paths comprises tracking the amount of data sent by flowlets along each of the plurality of paths.

3. The method of claim 1, wherein selecting the second path from the plurality of paths based upon the data indicative of sizes of flowlets along paths of the plurality of paths comprises selecting the second path of the plurality of paths to equalize an average flowlet size across the plurality of paths.

4. The method of claim 1, where selecting the second path from the plurality of paths based upon the data indicative of sizes of flowlets along paths of the plurality of paths comprises selecting the second path from the plurality of paths based upon a probability of selecting the second path from the plurality of paths that is proportional to a relative size of flowlets along the second path compared to sizes of flowlets along the plurality of paths.

5. The method of claim 1, wherein assigning the first flowlet to the first path comprises assigning the first flowlet to the first path within a multi-rooted tree design network.

6. The method claim 1, wherein assigning the first flowlet to the first path comprises randomly selecting the first path from the plurality of paths.

7. The method of claim 1, wherein assigning the first flowlet to the first path comprises assigning the first flowlet to the first path based upon the data indicative of sizes of flowlets along paths of the plurality of paths.

8. An apparatus comprising:
a network interface configured to send and receive network flows over a network; and
a processor configured to:
assign a first flowlet of a flow of traffic from a source network device to a destination network device to a first path of a plurality of paths between the source network device and the destination network device;
collect data indicative of sizes of flowlets along paths of the plurality of paths by tracking one or more of an amount of data sent by flowlets along each of the plurality of paths or a duration of time of flowlets along each of the plurality of paths;
detect a second flowlet of the flow in response to an interruption in transmission of the flow along the first path, wherein the interruption is longer in duration than a difference in a transmission time between the source network device and the destination network device along each of the plurality of paths;
select a second path from the plurality of paths based upon the data indicative of sizes of flowlets along paths of the plurality of paths; and
assign the second flowlet to the second path of the plurality of paths.

9. The apparatus of claim 8, wherein the processor is configured to collect the data indicative of sizes of flowlets along paths of the plurality of paths by tracking the amount of data sent by flowlets along each of the plurality of paths.

10. The apparatus of claim 8, wherein the processor is configured to select the second path from the plurality of paths based upon the data indicative of sizes of flowlets along paths of the plurality of paths by selecting the second path of the plurality of paths to equalize an average flowlet size across the plurality of paths.

11. The apparatus of claim 8, wherein the processor is configured to select the second path from the plurality of paths based upon the data indicative of sizes of flowlets along paths of the plurality of paths by selecting the second path from the plurality of paths based upon a probability of selecting the second path from the plurality of paths that is proportional to a relative size of flowlets along the second path compared to sizes of flowlets along the plurality of paths.

12. The apparatus of claim 8, wherein the processor is configured to assign the first flowlet to the first path by assigning the first flowlet to the first path within a multi-rooted tree design network.

13. The apparatus of claim 8, wherein the processor is configured to assign the first flowlet to the first path by randomly selecting the first path from the plurality of paths.

14. The apparatus of claim 8, wherein the processor is configured to assign the first flowlet to the first path by assigning the first flowlet to the first path based upon the data indicative of sizes of flowlets along paths of the plurality of paths.

15. One or more non-transitory computer readable storage media encoded with software comprising computer executable instructions and when the software is executed operable to cause a processor to:
assign, at a network connected device, a first flowlet of a flow of traffic from a source network device to a destination network device to a first path of a plurality of paths between the source network device and the destination network device;
collect, at the network connected device, data indicative of sizes of flowlets along paths of the plurality of paths by tracking one or more of an amount of data sent by flowlets along each of the plurality of paths or a duration of time of flowlets along each of the plurality of paths;
detect a second flowlet of the flow in response to an interruption in transmission of the flow along the first path, wherein the interruption is longer in duration than a difference in a transmission time between the source network device and the destination network device along each of the plurality of paths;
select a second path from the plurality of paths based upon the data indicative of sizes of flowlets along paths of the plurality of paths; and
assign, at the network connected device, the second flowlet to the second path of the plurality of paths.

16. The one or more non-transitory computer readable storage media of claim 15, wherein the instructions that cause the processor to collect the data indicative of sizes of flowlets along paths of the plurality of paths comprise instructions that cause the processor to track the amount of data sent by flowlets along each of the plurality of paths.

17. The one or more non-transitory computer readable storage media of claim 15, wherein the instructions that cause the processor to select the second path from the plurality of paths based upon the data indicative of sizes of flowlets along paths of the plurality of paths comprise instructions that cause the processor to select the second path of the plurality of paths to equalize an average flowlet size across the plurality of paths.

18. The one or more non-transitory computer readable storage media of claim 15, wherein the instructions that cause the processor to select the second path from the plurality of paths based upon the data indicative of sizes of flowlets along paths of the plurality of paths comprise instructions that cause the processor to select the second path from the plurality of paths based upon a probability of selecting the second path from the plurality of paths that is proportional to a relative size of flowlets along the second path compared to sizes of flowlets along the plurality of paths.

19. The one or more non-transitory computer readable storage media of claim 15, wherein the instructions that cause the processor to assign the first flowlet to the first path comprises instructions that cause the processor to assign the first flowlet to the first path within a multi-rooted tree design network.

20. The one or more non-transitory computer readable storage media of claim 15, wherein the instructions that cause the processor to assign the first flowlet to the first path comprise instructions that cause the processor to assign the first flowlet to the first path based upon the data indicative of sizes of flowlets along paths of the plurality of paths.

\* \* \* \* \*